L. D. WEST.
FUEL SAVER AND SMOKE CONSUMER.
APPLICATION FILED JUNE 12, 1917.
1,267,295.
Patented May 21, 1918.
2 SHEETS—SHEET 1.
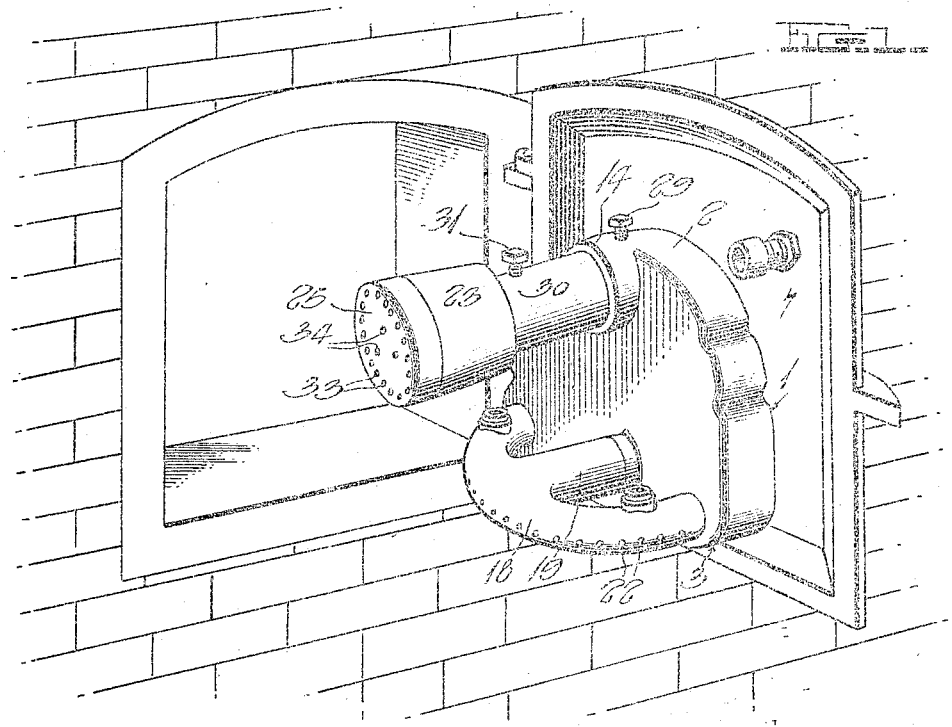
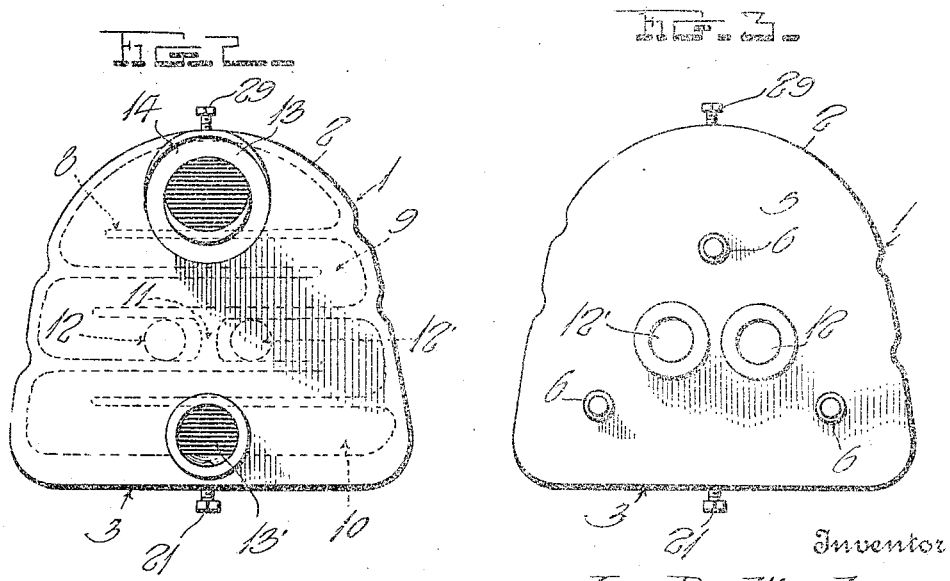
Witness
H. Woodard
Inventor
L. D. West
By H. Williams & Co.
Attorneys

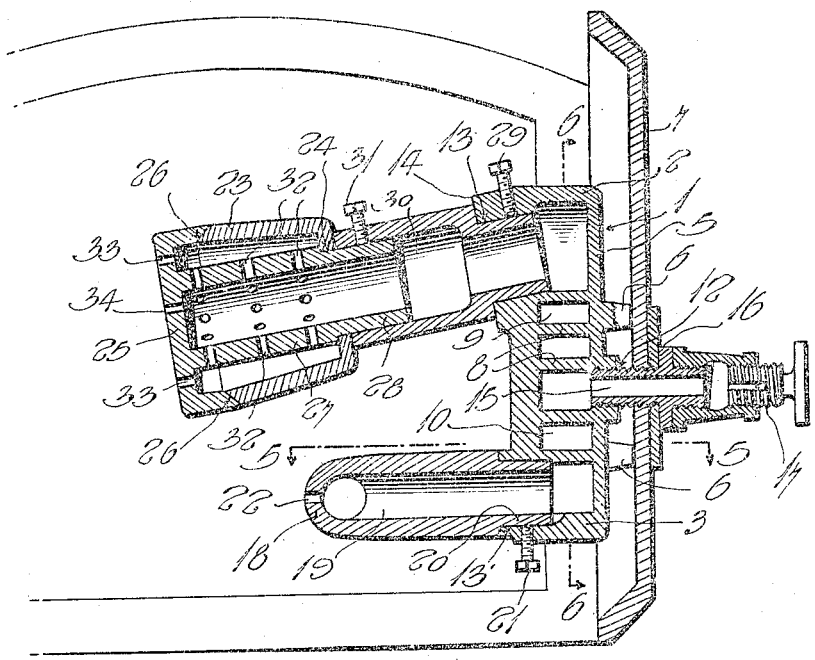
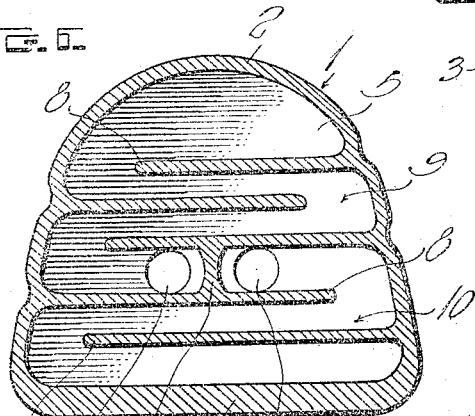
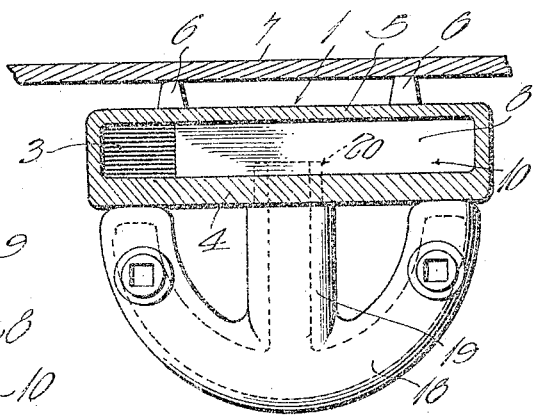

UNITED STATES PATENT OFFICE.

LEONIDAS D. WEST, OF DENVER, COLORADO.

FUEL-SAVER AND SMOKE-CONSUMER.

1,267,295.      Specification of Letters Patent.      Patented May 21, 1918.

Application filed June 12, 1917. Serial No. 174,319.

*To all whom it may concern:*

Be it known that I, LEONIDAS D. WEST, a citizen of the United States, residing at Denver, in the county of Denver and State of Colorado, have invented certain new and useful Improvements in Fuel-Savers and Smoke-Consumers; and I do declare the following to be a full, clear, and exact description of the invention, such as will enable others skilled in the art to which it appertains to make and use the same.

My invention relates to that class of devices designed for consuming smoke and soot and reducing the quantity of fuel burned in all types of stoves and furnaces, by supplying a sufficient quantity of superheated air into a combustion chamber of the stove or furnace to mingle with the hot gases therein, whereby to facilitate combustion.

One object of the invention is to provide means for simultaneously supplying two currents of hot air to the combustion chamber at different temperatures, whereby a circulation of air is produced which causes effective mixing of the same with the smoke and other hot gases in the combustion chamber.

In carrying out the above end, two air heating passages are provided, said passages being of different lengths so that the air in one will contact on a longer surface of hot metal, and will thus be heated to a higher extent than that in the other passage, a further object being to provide the outlets of said passages with means for spraying the heated air into the combustion chamber, it having been found that when the air is discharged in this manner, more effective mixing with the hot gases in said chamber takes place.

Yet another object is to so construct one of the spraying devices as to cause the same to choke down the air passing therethrough so that such air is superheated before being discharged.

A still further object is to provide simple means of attaching and detaching the two air spraying devices and to construct such devices in numerous sizes, so that conditions may be met which require the use of different quantities of hot air, this construction also permitting the use of spraying devices of such a size as to in no manner interfere with the operation of the stove or furnace door, since in most cases the device will be attached to the latter.

Other objects are to so construct the entire device as to permit the same to be easily and inexpensively manufactured and marketed, and applicable to all types of stoves and furnaces.

With the foregoing general objects in view, the invention resides in certain novel features of construction and unique combinations of parts to be hereinafter fully described and claimed, the descriptive matter being supplemented by the accompanying drawings which constitute a part of this application and in which:

Figure 1 is a perspective view of the invention applied to a furnace door, the latter being shown in open position;

Figs. 2 and 3 are respectively front and rear elevations of the body of the device;

Fig. 4 is a vertical longitudinal section;

Fig. 5 is a horizontal section on the plane of the line 5—5 of Fig. 4;

Fig. 6 is a vertical transverse section through the body of the device on the plane indicated by the line 6—6 of Fig. 4.

In the embodiment illustrated in the drawings above briefly described, the numeral 1 has reference to a flat cast metal casing preferably having an arched top 2 and a horizontal bottom 3, the latter and the rear side 4 of the casing being by preference of greater thickness than the other parts thereof since they are subjected to a greater amount of heat. The front side 5 of casing 1 is provided with three or more feet 6 cast integrally therewith and adapted to bear against the inner side of a stove or furnace door 7. By means of the feet 6, the casing is spaced from the door sufficiently to permit a free circulation of hot air between the two, this circulation tending to increase the efficiency of the device.

The casing 1 is provided with a plurality of staggered horizontal partitions 8 forming therein upper and lower air passages 9 and 10, respectively, the former being of greater length than the latter in order that the air passing therethrough will be heated to a higher temperature since it contacts with a greater amount of hot metal. The two passages 9 and 10 are separated by a vertical web or partition 11 and openings 12 and 12' are formed through the front wall 5 of the casing to deliver air into the inner ends of said passages. The outer ends of the passages 9 and 10 are provided with outlet openings 13 and 13' respectively, the former opening through a boss 14 at the upper end of the rear side 4, said boss having its rear end inclined downwardly and forwardly as shown most clearly in Fig. 4.

Suitable pipe connections 15 pass through door 7 and are threaded into the openings 12 and 12', the outer ends of said connections having external shoulders 16 which abut the door so that when the connections are tightened, the entire casing 1 will be rigidly clamped to the door. Suitable valves 17 are provided at the outer ends of the connections 15 for controlling the amount of air passing therethrough, according to the requirements.

An air spraying head 18 preferably of the semi-circular shape shown, is provided with an inlet neck 19 having a reduced end 20 received removably in the opening 13' and clamped therein by a set screw or the like 21, the periphery of said head being shown as having perforations 22 whereby the hot air will be sprayed therefrom in a plurality of horizontal jets. Should occasion require, however, other openings such as 22 could well be employed and located wherever required. The particular shape of the head 18 and its location in the firebox, assures that it shall be heated to a high temperature for properly heating the air supplied thereto through the inlet 12' and the passage 10, but by the construction now to be described, the air from the upper passage 9 is superheated before being discharged into the combustion chamber.

A casing 23 of cast metal is provided, one end of said casing being open whereas the other end thereof is formed with a central opening 24. A cast metal cover 25 is provided for the casing 23 and the contacting edges of said cover and casing are chamferred as shown at 26 so that the two are held in proper relation, said cover having a tubular neck 27 extending through the casing 23 and formed with a reduced rear end 28 which projects through the opening 24. The end 28 may be received directly in the opening 13 and clamped therein by a set screw 29, or as shown in the drawings, a cast metal extension 30 may be secured in said opening at one end and may receive the portion 28 of the neck in its other end, said section being equipped with a set screw or the like 31 for clamping the neck in place.

Neck 27 is formed with perforations 32 which permit the air from the passage 9 to escape into the casing 23 after being first heated to a considerable extent in said neck. Since the casing is subjected to the flames and hot gases in the fire-box, it is maintained at a noticeably higher temperature than the neck 27 with the result that the air discharged into said casing will be superheated and then discharged through perforations 33 in the cover 25. In most cases, said cover will be formed with other perforations 34 for discharging a restricted amount of air directly from the neck 27 into the firebox, but these perforations may be omitted if found desirable.

By the construction described, it will be obvious that the air passing through passage 9 is not only heated a greater amount than that flowing through the passage 10, due to the relative lengths of said passages, but that the air discharged from said first named passage is superheated within the casing 23 so that when it is finally discharged into the combustion chamber through the perforations 33, its temperature will be noticeably higher than that passing from the perforations 22 of the head 18. Two currents of air discharged at different temperatures, cause a violent circulation thereof to take place in the combustion chamber and it is this circulation which insures thorough mixing of the air with the smoke and hot gases in the combustion chamber. The high temperature of the air supplied, when thoroughly mixed with the smoke and gases, causes eight parts of oxygen to instantly unite with three parts of carbon, producing $CO_2$ which causes perfect combustion of the smoke and prevents accumulation of soot and carbon in the stove or furnace. Since all of this waste matter is consumed by combustion, heat is derived therefrom and thus only a minimum amount of fuel is required to produce the maximum energy.

Particular emphasis is laid upon the fact that the casing 23 and associated parts as well as the head 18, may be quickly and easily attached and detached, and projected suitable distances into the combustion chamber by the insertion of spacers 30 such as that above described. This detachable construction permits the device of the right size and capacity to be applied and also allows replacing of damaged parts or easy repairing thereof.

I also attach great importance to the relative shapes of the two air spraying devices, since such shapes produce better results than others, and to the supplying of two currents of air at different temperatures. This difference in temperature, as above set forth, causes a circulation of the incoming heated air which causes it to commingle and more readily mix with the hot gases and smoke, than is otherwise possible.

From the foregoing, taken in connection with the accompanying drawings, it will be obvious that although my invention is of extremely simple and inexpensive nature, the same will be highly efficient and durable. Since probably the best results are obtained from the specific construction shown and described, such construction constitutes the preferred form of the improved fuel saving and smoke consuming device. I wish it understood, however, that within the scope of the invention as claimed, numerous minor changes may be made without sacrificing the principal advantages. For instance, the device may be secured to the door in any suitable manner other than that shown and could well be constructed in multiple for exceptionally large furnaces.

I claim:

1. A fuel saver and smoke consumer comprising a casing having an open end and having in its other end an opening, a perforated cover for said casing, and a perforated tubular neck joined to said cover and extending through said casing and opening.

2. A fuel saver and smoke consumer comprising a hollow substantially flat cast metal body disposed vertically and having in one flat side a pair of horizontally spaced fluid inlet openings, the other flat side of said body having a fluid outlet in each of its upper and lower ends, and an upper and a lower series of horizontal staggered partitions in said body above and below said inlets, the lowermost of said upper series and the uppermost of said lower series being connected by a short vertical partition located between said inlet openings, whereby two zigzag fluid heating passages are provided leading from said inlet openings to said outlet openings, said passages being of different lengths for supplying heated fluid at different temperatures.

3. A structure as specified in claim 2, together with fluid spraying devices having necks detachably secured in said outlets.

In testimony whereof I have hereunto set my hand.

LEONIDAS D. WEST.